United States Patent [19]

Naumann

[11] Patent Number: 4,671,523

[45] Date of Patent: Jun. 9, 1987

[54] STEERING MECHANISM FOR A MOTOR VEHICLE

[75] Inventor: Fritz Naumann, Stammham, Fed. Rep. of Germany

[73] Assignee: Audi AG, Ingolstadt, Fed. Rep. of Germany

[21] Appl. No.: 817,858

[22] PCT Filed: Apr. 2, 1985

[86] PCT No.: PCT/EP85/00146

§ 371 Date: Dec. 5, 1985

§ 102(e) Date: Dec. 5, 1985

[87] PCT Pub. No.: WO85/04631

PCT Pub. Date: Oct. 24, 1985

[30] Foreign Application Priority Data

Apr. 6, 1984 [DE] Fed. Rep. of Germany ....... 3413007

[51] Int. Cl.⁴ .............................................. B62D 7/00
[52] U.S. Cl. ..................................... 280/91; 180/236; 180/141
[58] Field of Search ................... 280/91; 180/236, 141, 180/142, 143

[56] References Cited

U.S. PATENT DOCUMENTS

| 3,856,102 | 12/1974 | Queen | 280/91 |
| 4,263,979 | 4/1981 | Sturgill | 280/91 |
| 4,406,472 | 9/1983 | Furukawa | 280/91 |

FOREIGN PATENT DOCUMENTS

| 2014972 | 10/1971 | Fed. Rep. of Germany | 180/236 |
| 3124821 | 3/1982 | Fed. Rep. of Germany | . |
| 3300640 | 7/1984 | Fed. Rep. of Germany | . |
| 2351841 | 12/1977 | France | . |
| 2534866 | 4/1984 | France | . |
| 2045182 | 10/1980 | United Kingdom | 280/91 |
| 2083422 | 3/1982 | United Kingdom | . |
| 2114519 | 8/1983 | United Kingdom | . |
| 745757 | 7/1980 | U.S.S.R. | 280/91 |

Primary Examiner—John J. Love
Assistant Examiner—Kenneth R. Rice
Attorney, Agent, or Firm—J. M. Dulin, Ltd.

[57] ABSTRACT

Steering mechanism for a motor vehicle with steerable front wheels and steerable rear wheels, the steering of the rear wheels being effected as a function of the steering angle and the steering torque to the steering device of the front wheels. The steering torque is determined by interrogation of the work medium pressure of the hydraulic servo-steering for the front wheels.

9 Claims, 1 Drawing Figure

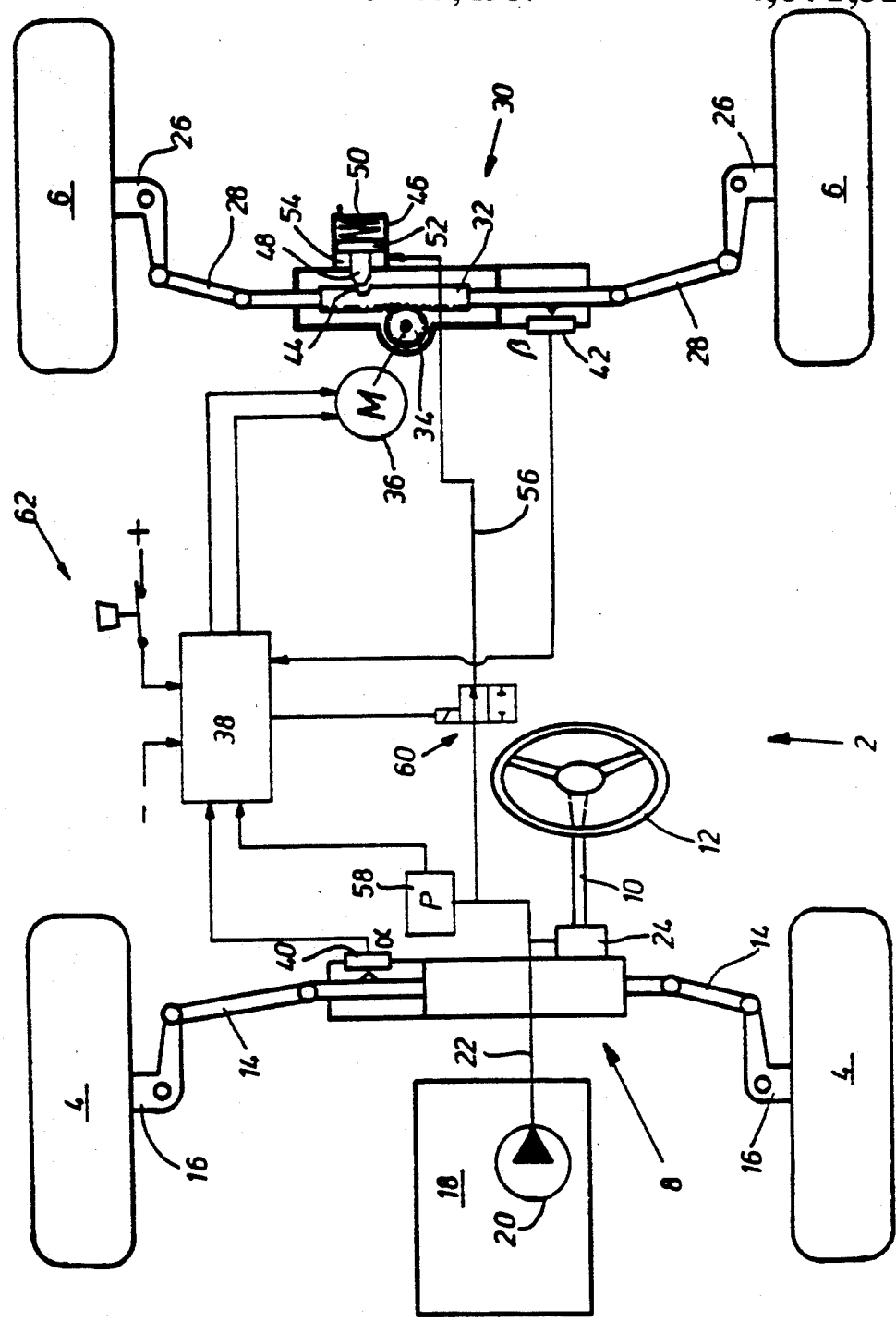

STEERING MECHANISM FOR A MOTOR VEHICLE

The invention involves a steering mechanism for a motor vehicle with steerable front wheels and steerable rear wheels and more particularly to rear wheel steering means responsive to front wheel steering torque.

Steering devices of this type are identified for example by publications DE-OS Nos. 31 24 821 and 31 33 985. The steering angle and the speed of the motor vehicle are tracked, among others, as vehicle specific parameters and used to derive the degree of turning of the rear wheels. In addition, the lateral acceleration and the yaw angle of the vehicle can be factored into the calculation.

The intention of these measures is to obtain increased stability in curves, a faster response of the motor vehicle's steering in curve maneuvers, and finally greater maneuverability for parking. The steering of the rear wheels can result in either positive or negative indications; in other words, the rear wheels can either be steered in the same sense as the front wheels or in the opposite sense against the front wheels. In this case, the first-mentioned measure (positive indication) works against oversteering the vehicle when driving through fast curves. The latter measure (negative indication) serves particularly to diminish the turning radius and to provide rapid entry into sharp curves.

The handling of relatively high performance passenger cars is extremely problematic in terms of stability at the front and rear wheels. Steering and handling devices for the rear wheels, and particularly the necessary sensors, pose significant challenges. For this reason, implementation of such devices is in practice extremely expensive. In addition, the dynamic effects of road conditions have not been adequately factored in, so that even small slippage between the road and tire could cause instability due to the rear wheel steering device.

The objective of the invention, therefore, is to create a more simple device of this type which also takes into account actual road conditions.

This objective is fulfilled according to the invention by providing means for steering the rear wheels dependent on the steering angle of the front wheels and the steering torque developed on the front wheels. It turns out that the torque exerted by the vehicle operator on the steering of the front wheels has a relevant effect on the handling of the rear wheels. Note that the steering torque is affected by a number of driving specific parameters, such as the speed of the vehicle, the friction of the road surface, the curve radius, etc.

For example, only a small steering torque can be developed on a road surface covered with smooth snow. In addition, the torque is kept small by the generally cautious response of the driver under such slippery road conditions. Similar considerations apply when the vehicle is driven at high speed. In this case, according to the invention, a very small or even no turning degree is imparted to the rear wheels.

On the other hand, the steering torque increases almost immediately when, for example, a sudden obstacle in the road causes an extreme steering reaction on the front wheels. Through a corresponding turning of the rear wheels, an increased bypass impulse is created (the vehicle moves out of the way faster). If the steering torque then decreases, the turning degree of the rear wheels is again more or less adjusted according to the steering angle of the front wheels.

If, during parking of the vehicle, a large steering torgue is developed, then a relatively strong turning of the rear wheels also occurs. A large torque can be developed even on smooth road surfaces when the front wheels reach their end turning point thus causing internal resistance.

The steering torque can be obtained by measuring the force transmitted from the steering wheel to the steering gear, for example, within the steering column. Devices for this are common in the application of power steering mechanisms.

According to the invention, steering of the rear wheels is eliminated by very small steering torques. Thereby, unproblematical tracking of the vehicle is ensured at high speeds or in long curves or during slightly changing steering maneuvers. The concept rests on the finding that under these and similar driving conditions, the unavoidable elasticity of the unsteered rear wheels causes more advantageous tracking conditions and therefore that the vehicle is more easily handled by the driver. This concept is carried one by mechanically blocks steering action of the rear wheels.

Implementation according to patent claim 3 is particularly simple and convenient on vehicles with power steering systems for the front wheels. A pressure dependent switch can be incorporated in the power steering hydraulic system which generates a signal proportional to pressure which is processed by an appropriate electronic control device.

The functional safety of the steering device can be further increased initiating rear wheel steering only after the front wheels exceed a predetermined steering angle. Thus, the front wheel steering angle can be used as a threshold function (electronic control). Since the steering angle is required in any case for controlling the rear wheel steering angle, this measure represents no additional expense. Through a logical combinatorial circuit, it is ensured that the rear wheel steering is only actuated by the presence of both signals (pressure and steering angle).

Further practical and advantageous characteristics and configurations are presented by locking-out rear wheel steering when the steering angle, alpha, and steering torque on the front wheels drop below specified predetermined values, and where the steering mechanism can be turned off, and where the rear steering device is a rack on pinion mechanism in which the rack includes a notch which engages a locking pin in the center position, the locking pin being hydraulically actuated in response to a predetermined level of the power steering unit of the front wheels to unlock the rack, and where the turning speed of the rear wheels is governed by the steering torque of the front wheels, and where the rear wheels are turned to a center position at predesigned high speed.

Steering to the rear wheels can be totally turned off, when, for example, there is no room to move out the rear of the vehicle during parking or if passengers in the vehicle are sensitive due to their health to rapid yawing motions.

The hydraulic locking pin mechanism responsive to working fluid pressure is a particularly simple and reliable interlocking device for the rear wheel steering system.

The characteristics of the invention increase the response speed of the steering device, for example, during sudden avoidance maneuvers and also ensure rapid stabilization of the vehicle after a curve maneuver.

An application example of the invention is described in greater detail in the following. The schematic drawing shows a motor vehicle with a steering device with steerable front and rear wheels.

A motor vehicle 2 is fitted with steerable front wheels 4 as well as steerable rear wheels 6. The front wheels 4 are actuated by a hydraulic power steering device 8, which is connected to the steering wheel 12 through the steering column 10. Transmission from the power steering 8 to the front wheels 4 is accomplished by means of trailing arms 14 and steering knuckles 16.

The power steering unit 8, not further described here, is supplied with hydraulic fluid by a pump 20 driven by the vehicle's engine 18. The hydraulic fluid is fed to a steering valve 24 with open midsection by means of line 22.

Further, the steerable rear wheels are connected by means of steering knuckles 26 and trailing arms 28 to a rack and pinion steering device 30. The pinion 34 connected to the rack 32 of the steering device 30 is actuated by an electrical servo motor 36. The servo motor 36 is controllable in both turning directions. The control of the servo motor 36 is handled by an electronic control 38, which is connected to the vehicle electrical system (not shown).

Steering angle sensors 40, 42 are connected to the power steering 8 and the rack and pinion steering 30 units respectively, which, starting from the center position of the steering unit, give an angle voltage signal to the control electronics (38) depending on the positive (alpha) or negative (beta) steering angle of the front and rear wheels 4,6.

Further, a notch 44 is located on the rack 32 of the steering device 30 which, in the center steering position, mates with a corresponding locking pin 48 located in a bearing housing 48. The locking pin 48 is pressed against the rack 32 by means of a spring 50 so that it catches the notch 44, thus blocking the rack 32. It is understood that the slightly conical shape of the part of the pin 48 in contact with the notch 44 makes the pin a self-locking device.

The locking pin 48 ends in a piston part 52, which runs in the housing 46 and forms a chamber 54 which is connected by line 56 to line 22 and thus to the power steering unit 8.

Further, line 22 contains a pressure sensor 58, which gives a pressure proportional signal to the control electronics 38. When the steering wheel 12 is turned, a steering torque is generated to overcome the resisting forces caused by road friction, vehicle speed, the steering angle of the front wheels 4 and the turning speed. This torque produces a proportional or analogous pressure in line 22 between the pump 20 and the steering valve 24, which corresponds to the pressure indicated by the hydraulic steering device (power steering). Thereby, the steering valve 24 with open midsection controls in the usual manner the not illustrated return flow of the hydraulic fluid to a vacuum container and simultaneously connects line 22 with one of the hydraulic working chambers of the power steering unit.

The pressure of the working fluid in line 22, corresponding to the steering torque, is converted by sensor 58 into a corresponding signal transmitted to the control electronics 38.

At the same time, the current steering angle and, where applicable, the turning speed are picked up by steering angle sensor 40 as positive or negative values, which are also transmitted to the control electronics 38.

If a prescribed pressure threshold is exceeded, for example 30 Bar in line 22, and if a prescribed turning angle alpha is also exceeded, say 15% of the maximum turning angle from the steering unit's midpoint, the control electronics 38 actuate the servo motor 36, producing a likewise positive or negative turning of the rear wheels 6. This turning results more from a large steering torque on the power steering unit 8 with a higher speed than from a lower torque.

The spring 50 is so designed that it holds the locking pin 48 in the notch 44 of the rack 32 up to the pressure threshold of 30 Bar. Above this pressure, the locking pin 48 is pulled back by the stronger hydraulic force of the piston 52 in the chamber 54.

In line 56 between line 22 and chamber 54 at the locking pin 48, a shutoff valve 60 is located, which can cut off line 56. The shut off valve is closed when the manually actuated breaker switch 62 cuts off power from the control electronics 38.

The steering torque on the front wheels 4 therefore affects the corresponding control of the rear wheels, where this control is at least partially self-adjusting. As soon as a change in direction is transmitted by the turning of the rear wheels, the steering torque in front automatically decreases, which, in turn, causes readjustment of the rear wheels depending on the magnitude of the reduction in torque. If the pressure P in line 22 drops below the prescribed pressure threshold, the rear wheels are returned to their center position (no turning) and at the same time the steering rack is locked by locking pin 48 seated in the notch 44. The return positioning of the rack and pinion steering 30 takes place with a pre-designed, high speed.

The control electronics 38 can be fitted with a microprocessor which stores both the steering torque corresponding to the upper pressure threshold as well as the maximum prescribed steering angle (alpha) along with its second derivative. Further, where applicable, the velocity V of the vehicle can be given. From data from a preferably empirically derived range, a closed control loop through a steering angle sensor 42 can be developed based on adjustment of the steering angle beta of the rear wheels by means of the servo motor 36.

I claim:

1. Steering device for a motor vehicle having steerable front and rear wheels comprising:
   (a) means for steering the rear wheels dependent on the steering angle of the front wheels, and at least on one other drive-specific parameter;
   (b) said other parameter is the steering torque developed on the front wheels; and
   (c) said rear wheel steering means includes means for preventing steering of the rer wheels below a specified predetermined steering torque.

2. Steering device as in claim 1, wherein the front wheels are steered by means of a power steering unit, and the working fluid pressure of the steering unit is used as a parameter of said steering torque.

3. Steering device as in claim 1, wherein steering of the rear wheels only occurs after exceeding a specified predetermined steering angle of the front wheels.

4. Steering device as in claim 1, wherein the rear wheel steering device is locked when the steering angle and the steering torque on the front wheels drop below specified predetermined values.

5. Steering device as in claim 4, wherein the rear steering device is a rack and pinion mechanism, and said rack includes a notch which engages a locking pin in the center position.

6. Steering device as in claim 5, wherein said locking pin is hydraulically actuated in response to a predetermined level of working pressure of the power steering unit of the front wheels to unlock said rack.

7. Steering device as in claim 1, wherein the steering mechanism of the rear wheels can be turned off.

8. Steering device as in claim 1, wherein the turning speed of the rear wheels is governed by the steering torque of the front wheels.

9. Steering device as in claim 8, wherein the return positioning of the rear wheels to the center position occurs at predesigned high speed.

* * * * *